United States Patent [19]

Kugimiya

[11] Patent Number: 5,587,902
[45] Date of Patent: Dec. 24, 1996

[54] TRANSLATING SYSTEM FOR PROCESSING TEXT WITH MARKUP SIGNS

[75] Inventor: Shuzo Kugimiya, Nara, Japan

[73] Assignee: Sharp Kabushiki Kaisha, Osaka-fu, Japan

[21] Appl. No.: 67,143

[22] Filed: May 26, 1993

[30] Foreign Application Priority Data

May 26, 1992 [JP] Japan ................................ 4-133552
May 7, 1993 [JP] Japan ................................ 5-106405

[51] Int. Cl.$^6$ ...................................................... G06F 15/38
[52] U.S. Cl. ........................ 395/752; 395/754; 395/759; 395/798
[58] Field of Search .................... 364/419.02, 419.06, 364/419.08, 419.1; 595/148, 145

[56] References Cited

U.S. PATENT DOCUMENTS

| | | | |
|---|---|---|---|
| 4,821,230 | 4/1989 | Kumano et al. | 364/419 |
| 4,962,452 | 10/1990 | Nogami et al. | 364/419 |
| 4,964,030 | 10/1990 | Suzuki et al. | 364/419 |
| 4,994,966 | 2/1991 | Hutchins | 364/419 |
| 5,001,633 | 3/1991 | Fukumochi et al. | 364/469 |
| 5,005,127 | 4/1991 | Kugimiya et al. | 364/419 |
| 5,111,398 | 5/1992 | Nunberg et al. | 364/419 |
| 5,182,709 | 1/1993 | Makus | 364/419 |
| 5,270,928 | 12/1993 | Suzuki et al. | 364/419.05 |
| 5,276,616 | 1/1994 | Kuga et al. | 364/419.08 |

FOREIGN PATENT DOCUMENTS

| | | | |
|---|---|---|---|
| 63-108461 | 5/1988 | Japan | G06F 15/38 |
| 1-78372 | 3/1989 | Japan | G06F 15/38 |
| 3-9472 | 1/1991 | Japan | G06F 15/38 |
| 4-259057 | 9/1992 | Japan . | |
| 5-006396 | 1/1993 | Japan | G06F 15/38 |
| 7-182344 | 7/1995 | Japan | G06F 17/27 |
| 2197510 | 5/1988 | United Kingdom | G06F 15/38 |

OTHER PUBLICATIONS

R. Colin Johnson, "Machines Attach The Language Barrier", Electronic Engineering Times, 12 Sep. 1994, pp. 37, CMP Publications, Inc.

Katherine Eichler-Martin, "Craking the Not-Immediate Dilemma", CD-ROM Professional, p. 82, col 2, Jan. 1995.

Primary Examiner—Gail O. Hayes
Assistant Examiner—Felicia Ives

[57] ABSTRACT

A method and translating machine for translating a source language with markup signs into a target language maintaining the markup signs. The system includes a separation module for separating an original text into markup signs and a text body exclusive of the markup signs, a memory for storing each markup sign in association with a corresponding word or phrase, a module for producing a parsing tree in a target language corresponding to the original text body, and a translated sentence producing module for producing target language text by attaching markup signs to translated words corresponding to the original text based on the parsing tree in the target language.

10 Claims, 14 Drawing Sheets

FIG. 5

EXAMPLE ( This is a pen. )

• BUFFER A ...... ORIGINAL BUFFER

| t | h | i | s |   |   |   |
|---|---|---|---|---|---|---|
| i | s |   |   |   |   |   |
| a |   |   |   |   |   |   |
| p | e | n |   |   |   |   |
|   |   |   |   |   |   |   |

FIG. 6

• BUFFER B ...... PART OF BUFFER AS RESULT OF DICTIONARY LOOKUP

| this -- | PRONOUN | DEMONSTRATIVE ADJECTIVE |   |
|---|---|---|---|
| is -- | VERB |   |   |
| a -- | ARTICLE |   |   |
| pen -- | NOUN |   |   |

• BUFFER C .... BUFFER FOR RESULT OF SYNTACTIC ANALYSIS

• BUFFER D .... BUFFER FOR RESULT OF TREE CONVERSION

FIG. 9

• BUFFER E ....OUTPUT BUFFER

|   | START TAG | END TAG |
|---|-----------|---------|
| 1 | <term>    | <\term> |
| 2 | <emph>    | <\emph> |
|   |           |         |
|   |           |         |

FIG. 12  BUFFER A

One of the most useful points of this <term>Tag<\term> is that it can automatically <emph>produce<\emph> <term>table chart<\term> with the suitable size to the document without <emph>specifying<\emph> any parameters.

FIG. 13  BUFFER F

| WORD POSITION | WORD NUMBER | TAG |
|---------------|-------------|-----|
| 8             | 1           | <term> |
| 14            | 1           | <emph> |
| 15            | 2           | <term> |
| 25            | 1           | <emph> |
|               |             |     |

FIG.14

BUFFER B

| WORD POSITION | ENTRY |
|---|---|
| 0 | One |
| 1 | of |
| 2 | the |
| 3 | most |
| 4 | useful |
| 5 | points |
| 6 | of |
| 7 | this |
| 8 | Tag |
| 9 | is |
| 10 | that |
| 11 | it |
| 12 | can |
| 13 | automatically |
| 14 | produce |
| 15 | table |
| 16 | chart |
| 17 | with |
| 18 | the |
| 19 | suitable |
| 20 | size |
| 21 | to |
| 22 | the |
| 23 | document |
| 24 | without |
| 25 | specifiying |
| 26 | any |
| 27 | parameters |
| 28 | |

FIG.15

BUFFER B

| WORD POSITION | ENTRY | PART OF SPEECH | NUMBER OF WORDS |
|---|---|---|---|
| 0 | One | | |
| 1 | of | | |
| 2 | the | | |
| 3 | most | | |
| 4 | useful | | |
| 5 | points | | |
| 6 | of | | |
| 7 | this | | |
| 8 | Tag | | |
| 9 | is | | |
| 10 | that | | |
| 11 | it | | |
| 12 | can | | |
| 13 | automatically | | |
| 14 | produce | | |
| 15 | table | | |
| 16 | chart | | |
| 17 | with | | |
| 18 | the | | |
| 19 | suitable | | |
| 20 | size | | |
| 21 | to | | |
| 22 | the | | |
| 23 | document | | |
| 24 | without | | |
| 25 | specifiying | | |
| 26 | any | | |
| 27 | parameters | | |
| 28 | | | |

FIG.16

BUFFER B

| WORD POSITION | ENTRY | PART OF SPEECH | NUMBER OF WORDS | TAG |
|---|---|---|---|---|
| 0 | One | | | |
| 1 | of | | | |
| 2 | the | | | |
| 3 | most | | | |
| 4 | useful | | | |
| 5 | points | | | |
| 6 | of | | | |
| 7 | this | | | |
| 8 | Tag | | | <term> |
| 9 | is | | | |
| 0 | that | | | |
| 11 | it | | | |
| 12 | can | | | |
| 13 | automatically | | | |
| 14 | produce | | | <emph> |
| 15 | table | | | <term> |
| 16 | chart | | | <term> |
| 17 | with | | | |
| 18 | the | | | |
| 19 | suitable | | | |
| 20 | size | | | |
| 21 | to | | | |
| 22 | the | | | |
| 23 | document | | | |
| 24 | without | | | |
| 25 | specifiying | | | <emph> |
| 26 | any | | | |
| 27 | parameters | | | |
| 28 | | | | |

FIG. 18

BUFFER E

この<term>Tag<\term>の最も有益なポイントの一つは、それがパラメータを<emph>指定する<\emph>ことなしに文書に適当なサイズで<term>テーブルチャート<\term>を自動的に<emph>生み出す<\emph>ことができることである。

TRANSLATING SYSTEM FOR PROCESSING TEXT WITH MARKUP SIGNS

BACKGROUND OF THE INVENTION

1. Field of the Invention

The present invention relates generally to translating machines, and more specifically, to a translating machine capable of translating a document including markup signs for computer typesetting from one language into another language.

2. Description of the Related Art

Conventional translating machines in practical use include the following. A conventional translating machine inputs source language documents into a translation module initially using, for example, a keyboard under the control of a CPU (Central processing Unit). The translation module analyzes the input source language text utilizing a group of dictionaries (such as a basic dictionary stored in memory and a user dictionary prepared by user registration) and then produces a parsing tree from the analysis. Similarly, the parsing tree of the source language text is transformed into a parsing tree in a target language utilizing rules for transforming tree structures from a source language tree to a target language tree prestored in memory. An appropriate translation is given to each word, and then necessary additional parts are supplied to produce a final text in the target language.

In recent years, systems have been widely developed by which block copies for printing are produced utilizing small size computers. Therefore, additional information for printing (such as specifications for typesetting) is sometimes included in a document text. Such information includes information for designating a title, the font to be used, the size of the font, and the words to be employed as index entries.

These pieces of information are conventionally mixed into the text of the document to be processed in the form of markup signs. By including such markup signs in the document, the document can be automatically printed utilizing a format, a font, and a font size according to the markup information. When index entries are designated, the index can be readily produced by listing those words or groups of words attached to the text with such markup signs.

Markup languages have been developed as systems of markup signs. One example of such a language is the SGML (Standard Generalized Markup Language) established by the ISO (International Standardization Organization). SGML is used for designating a logical structure for a document such as chapters, paragraphs, and itemization. When a document produced in accordance with SGML is actually printed, a markup language is often used for more specifically deciding a format. One example of such a markup language is called TeX.

As the number of documents having designations for printing utilizing markup languages increased the demand for a technique for translating these documents into another language has also increased.

A document including markup signs as described above cannot be properly translated in a conventional translating machine. In some cases, the document cannot be translated at all. Alternatively, a mistranslation sometimes occurs because the markup signs are different from the source language included in the document. Conventionally, it was therefore necessary to manually check whether or not markup signs were included in an input text utilizing an editor or the like before inputting the text into a translating machine. Once all the markup signs were deleted one after another, the text could then be input into the translating machine. Accordingly, efficiency in translating a document including markup signs utilizing a conventional translating machine was very slow.

To overcome such disadvantages, a system for processing documents without consideration of non-language data (such as format information included in the document) is disclosed in Japanese Patent Laid-Open No. 4-259057. According to the system disclosed in this document, only language data is extracted from document data in which language and non-language data are mixed, and a prescribed editing processing is performed on the extracted language data. The language data edited by this editing processing is compared to the language data in the originally input document data for determining a corresponding relation between their positions. The language data of the input document data is replaced with the corresponding language data after the editing. This permits editing of document data in which the language data is mixed with format information by ignoring the presence of the non-language data.

However, various rules are necessary for determining the corresponding relationship between the edited language data and the input document data. One cannot immediately judge whether such rules are truly effective rules or not except by trial and error. And yet an effective corresponding rule is not necessarily present for every case. Employing such a rule mistakenly could even degrade the quality of an eventually obtained translated document.

SUMMARY OF THE INVENTION

It is therefore an object of the invention to provide a translating machine capable of translating a document including markup signs more efficiently than a conventional apparatus and of producing a translated document with equivalent markup signs.

Another object of the invention is to provide a translating machine capable of translating an English language document including markup signs into another language more efficiently than a conventional apparatus, and of producing a translated document with equivalent markup signs.

Yet another object of the invention is to provide a translating machine capable of translating an English language document including markup signs into a Japanese language document more efficiently than a conventional apparatus, and of producing a translated document with equivalent markup signs.

A translating machine according to the present invention translates an original text in a first language including one or a plurality of predetermined markup signs into a text in a second language. The translating machine includes a separation module for separating the original text into markup signs and a text main body exclusive of the markup signs, a memory for storing each markup sign in association with a specific word or phrase, a module for producing a parsing tree of the text main body without the markup signs into the second language, and a module for producing a text in the second language with markup signs inserted appropriately therein.

In the translating machine, the separation module separates an original text into markup signs and a text main body. The system stores the markup signs in memory. Each markup sign is associated with a particular work or phrase.

The module for producing a parsing tree performs a prescribed grammatical processing on the original text to produce a parsing tree in the second language. The module produces a text in the second language based on the parsing tree in the second language and the storage contents of the memory. In the produced text, a markup sign equivalent to each markup sign in the original is attached to the translation by the producing module.

In a preferred embodiment, the memory includes a plurality of term memories for respectively storing a word included in the original text, and a plurality of markup sign memories for storing markup signs attached to words stored in corresponding term memories. At least one of the markup sign memories is provided for each of the plurality of term memories.

Each word and markup sign (attached to the word) are stored in association with each other on a word-by-word basis. Therefore, any markup signs can readily be associated with a translation of these words as the text in the second language is produced from the parsing tree in the second language.

In the preferred embodiment, the first language is English and the second language is Japanese.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5 to 9 are representations schematically showing the storage contents of buffers A, B, C, D and E, respectively;

FIG. 11 is a representation schematically showing one example of a tag sign in SGML language;

FIG. 12 is a representation schematically showing an input original text as stored in buffer A;

FIG. 13 is a representation schematically showing the storage contents of buffer F;

FIG. 14 is a representation schematically showing the storage contents of buffer B;

FIG. 15 is a representation schematically showing the storage contents of buffer B after a dictionary lookup processing;

FIG. 16 is a representation schematically showing the storage contents of buffer B after attaching tag sign information;

FIG. 18 is a representation schematically showing the storage contents of buffer E after production processing.

DESCRIPTION OF THE PREFERRED EMBODIMENTS

A translating machine according to one preferred embodiment of the invention will be described in conjunction with accompanying drawings. An English-Japanese translating machine for translation of documents from the English language to the Japanese language will be described for purposes of illustration. The invention is however not limited to this machine but has applicability to machines for translating between other languages. Moveover, markup signs used by the markup language TeX (referred to as "tag sign(s)") are taken for purposes of illustration only. The invention is not limited to this language and is generally applicable to any language utilizing markup signs.

Figure 1:
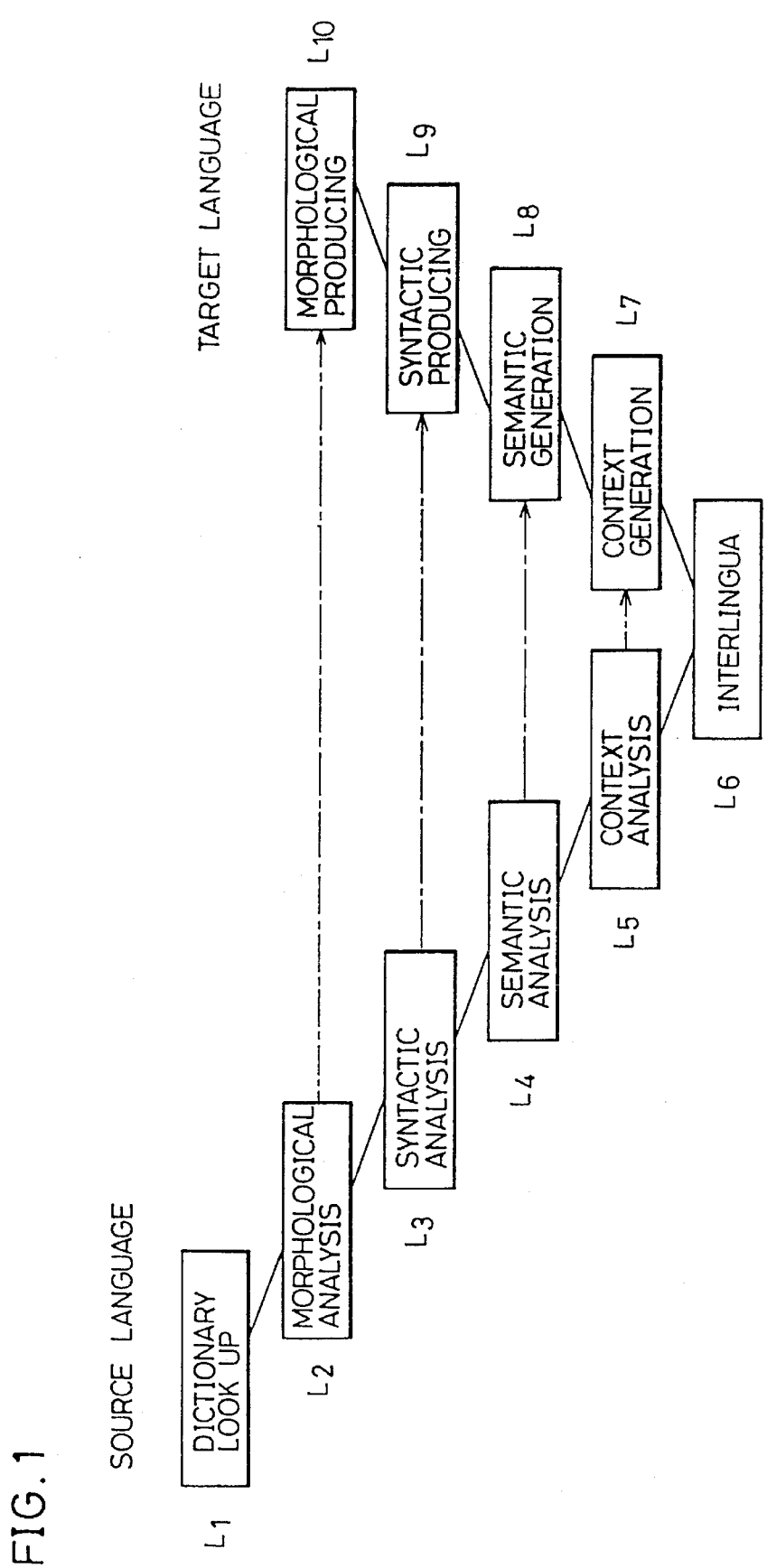
FIG. 1 is a representation schematically showing the concept of machine translation.

Before describing the embodiments, the concept of machine translation will be summarized. Referring to FIG. 1, an analyzing process performed by machine translation goes through various analysis levels. In machine translation, when a source language sentence (as displayed at the upper left in FIG. 1) is input, processing at various levels are sequentially performed and a target language sentence (as displayed at the upper right in FIG. 1) is eventually obtained. After, for example, a source language sentence is input, the analysis proceeds through selected steps from levels L1–L10 including a dictionary lookup processing at level L1, a morphological analysis processing at level L2, then a syntactic analyzing processing at level L3, . . . , and finally a morphological producing processing at level L10 is performed, thereby generating a target language sentence.

The methods for machine translation are roughly divided into the following two kinds depending upon the level at which the analyzing processing is performed. One method is the pivot method by which the analysis is performed up to the intermediate language (so called "interlingua") displayed in level L6, and a target language sentence is produced therefrom. The other method is the transfer method by which the analysis is performed through levels L2–L5 to obtain the internal structure of a source language sentence, then the obtained internal structure is converted into the internal structure of a target language at the same level as the internal structure of the source language. Thereafter, the target language sentence is produced.

An Interlingua (as used in the pivot method) is a conceptual intermediate language which does not depend on a source language or a target language. Accordingly, once the interlingua of a sentence is obtained by a single analyzing processing of the source language, a plurality of languages can be produced from this interlingua, which is advantageous for translating between several languages. According to such a pivot method, however, it is uncertain if the interlingua which is the essential concept of the method can really be obtained.

The transfer method is a compromise approach which accommodates possible inaccuracies in the interlingua associated with the pivot method, and today, many systems use the transfer method. The following description concerns the transfer method, and a translating machine according to a preferred embodiment which employs the transfer method.

Now, the content of each analyzing processing level shown in FIG. 1 will be described.

(L1 and L2) Dictionary Lookup, Morphological Analysis

In these processing levels, the source language is divided into morpheme strings (word strings) utilizing, for example, the longest coincidence method while referring to a dictionary which stores morphemes. Then, grammatical information such as the part of speech of each of the obtained words and a translation for each word are provided. The words are analyzed for determining the tense/person/number, etc. of each word within the sentence.

(L3) Syntactic Analysis

This processing level involves constructing and determining the structure (parsing tree) of the sentence based on the relationship between words using the part of speech variant. In this processing level, a determination of whether or not the obtained structure of the sentence represents the correct meaning is not performed.

(L4) Semantic Analysis

This level determines what is correct and not correct in terms of meaning from among a plurality of parsing trees obtained from the syntactic analysis processing for adopting the correct meaning.

(L5) Context Analysis

In the context analysis processing level, the topic of the input sentence is examined to remove any ambiguity and supply any omitted parts included in the input sentence.

Figure 2:
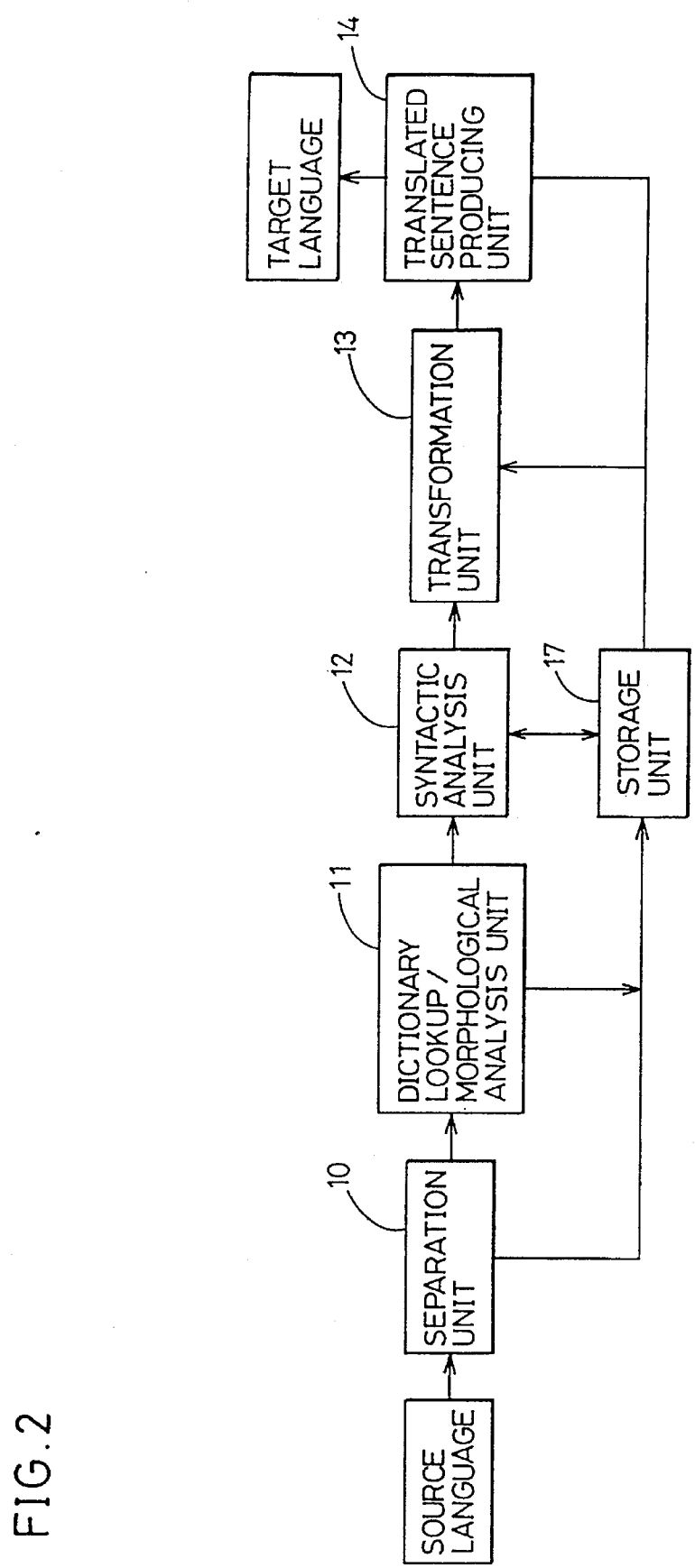
FIG. 2 is a representation schematically showing the structure of a translation machine for performing translation using the method.

In the translation module of the translating machine according to one embodiment of the invention which will be described below, it is assumed that analysis processing is performed as far as level L3. More specifically, the translation module of the translating machine according to a preferred embodiment has a structure as shown in FIG. 2. The translation module as shown in FIG. 2 includes a separation unit 10 for separating an original source language sentence into tag signs and text, a storage unit 17 for storing the tag signs associated with the words to which the signs are attached, a dictionary lookup/morphological analysis unit 11 for performing a dictionary lookup/morphological analysis processing on the text, a syntactic analysis unit 12 for performing a syntactic analysis on the input sentence after it has been morphologically analyzed, a transformation unit 13 for generating the parsing tree of a target language by transforming the results of the syntactic analysis, and a translated sentence producing unit 14 for producing a translated sentence in the target language (with inserted tag symbols) based on the parsing tree of the target language generated by transformation unit 13 and referring to the contents of storage unit 17. Processings performed in units 10–14 will be described in more detail in conjunction with the following embodiments.

Figure 3:
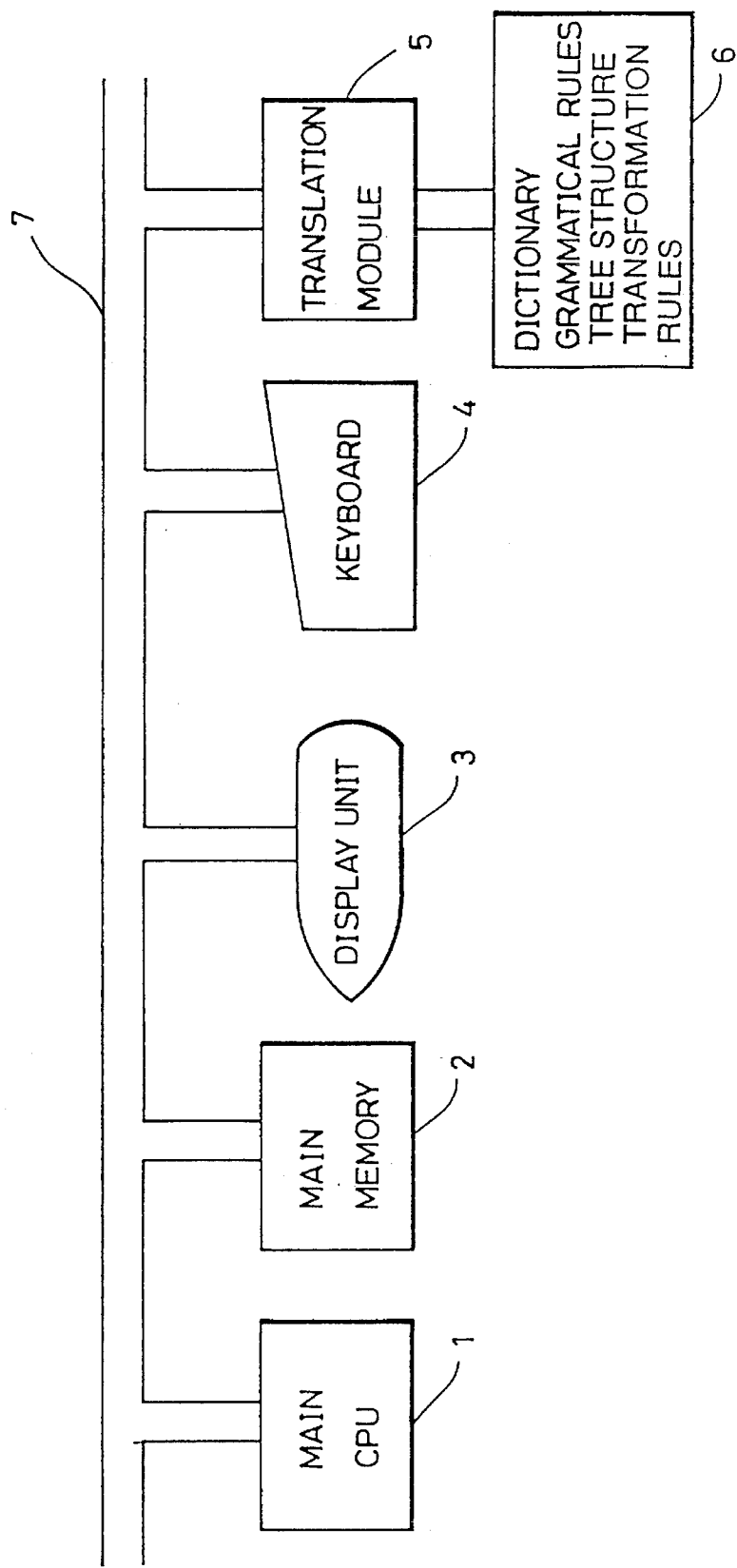
FIG. 3 is a block diagram showing a translating machine according to one embodiment of the invention.

FIG. 3 is a block diagram showing a translating machine according to one embodiment of the invention. Referring to FIG. 3, the translating machine includes a main CPU (Central Processing Unit) 1, a bus 7 to which the main CPU 1 is connected, a main memory 2 connected to bus 7, a display unit 3 formed of a CRT (Cathode Ray Tube) or an LCD (Liquid Crystal Device) connected to bus 7, a keyboard 4, a translation module 5 connected to bus 7, a memory 6 connected to translation module 5 for storing a knowledge base such as dictionary/grammatical rules and tree transformation structure rules for translation.

Figure 4:
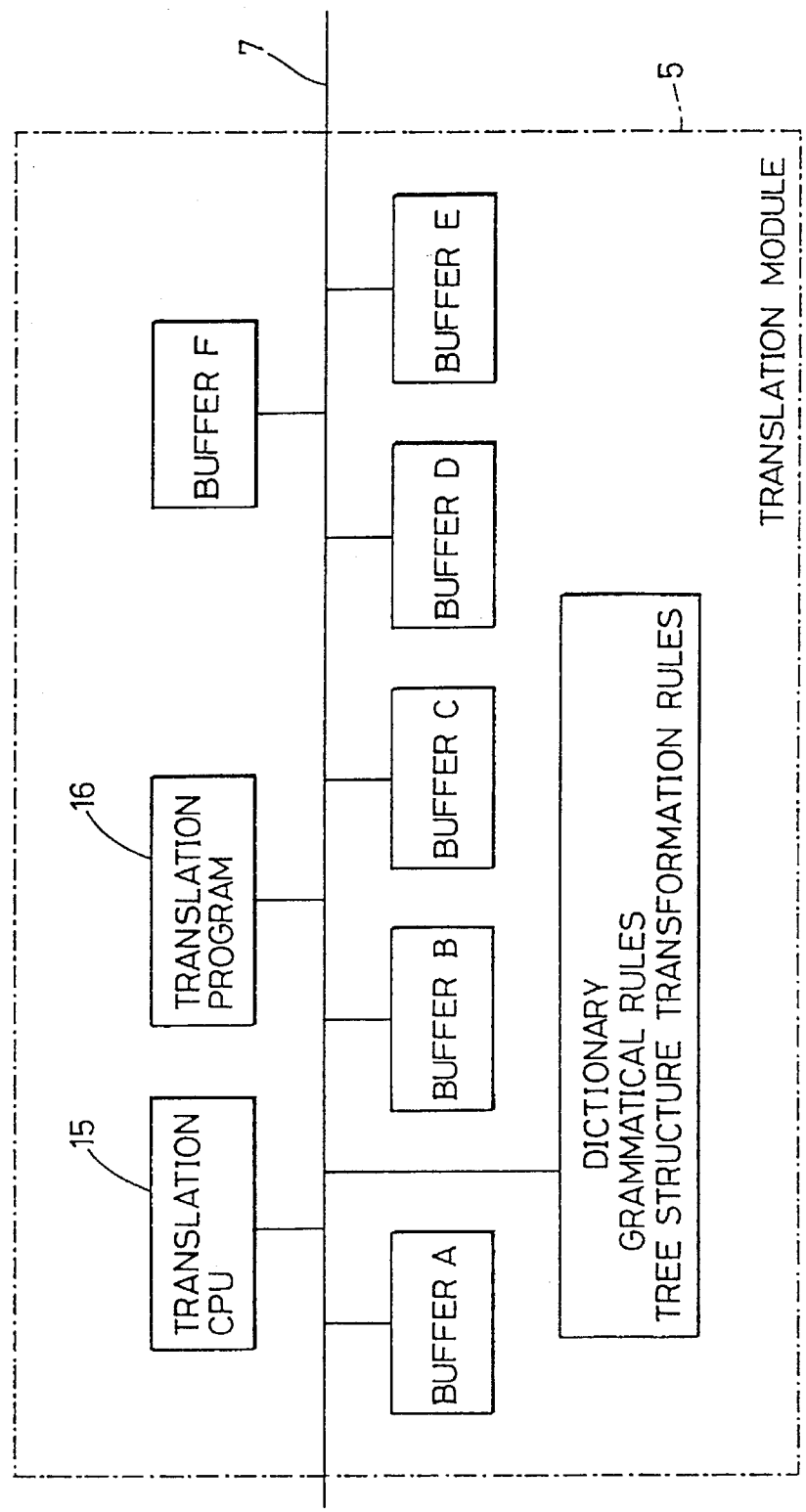
FIG. 4 is a block diagram showing in detail a translation module 5 as shown in FIG. 3.

When text in a source language is input, translation module 5 outputs a target language text by translating the text using a prescribed procedure. Referring to FIG. 4, translation module 5 includes a translation CPU 15 for translating a text in a source language (English language in the embodiment) input through bus 7 into a text in a target language (Japanese language in the embodiment) based on a prescribed translation program and for outputting the result to bus 7, a translation program memory 16 connected to bus 7 for storing the translation program executed at translation CPU 15, a buffer A for storing the input source language original text on a word-by-word basis, a buffer B for storing information such as the part of speech, and translation of each word referring to a dictionary included in memory 6 for every word stored in buffer A, a buffer C for storing information related to the parsing tree of the source language text, a buffer D for storing the parsing tree of the target language text which is generated by transforming the parsing tree of the source language text stored in buffer C, and a buffer E for storing a sentence rearranged in a Japanese style by adding appropriate particles and auxiliary verbs to the parsing tree of the Japanese text stored in buffer D, and a buffer F for storing tags, the number of words to which the tags are attached, etc. which are used in a tag removing processing which will be described later. These buffers correspond to storage unit 17 (FIG. 2).

Now, referring to FIGS. 2–9, an operation of an English to Japanese language translation performed by the translating machine according to a preferred embodiment will be described. A translation program executed in translation CPU 15 will be later described in detail.

A read original text is segmented into morphemes by a morphological analysis, and separated into tag signs and text by separation unit 10 (FIG. 2). The text body is stored in buffer A as illustrated in FIG. 5. The tag signs are stored in buffer F.

Then, the part of speech for each word in the original text stored in buffer A is determined using the dictionary lookup/ morphological analysis unit 11 as illustrated in FIG. 2. The resulting information is stored in buffer B. The part of speech information for each word is stored as illustrated in FIG. 6. More specifically the word "this" for example has a plurality of parts of speech associated with it, i.e., two parts of speech, pronoun and demonstrative adjective. The part of speech for the word "is" is verb. Similarly, the parts of speech for the letter "a" and the word "pen" are stored in buffer B.

Figure 7:
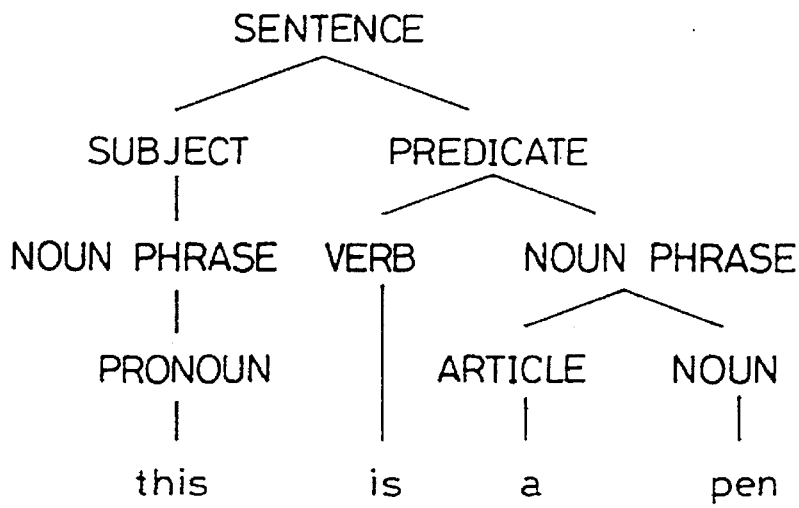

Since the word "this" has a plurality of parts of speech, the part of speech to be employed in the sentence is uniquely decided by a processing performed by the syntactic analysis unit 12. In the processing performed by the syntactic analysis unit 12 in the translation program, a parsing tree showing the relationship between the words is performed (as illustrated in FIG. 7) based on the dictionary and grammatical rules stored in memory 6. The results of the syntactic analysis are stored in buffer C.

The parsing tree is produced as follows. Among the grammatical rules stored in memory 6, grammatical rules for translating to the English language include the following rules:

Sentence → Subject, Predicate

Subject → Noun Phrase

Predicate → Verb, Noun Phrase

Noun Phrase → Pronoun

Noun Phrase → Article, Noun

The parsing tree is decided based on these grammatical rules. Such grammatical rules are also prepared for translating to the Japanese language, and correspondence is preestablished between the English language grammatical rules and the Japanese language grammatical rules.

Figure 8:
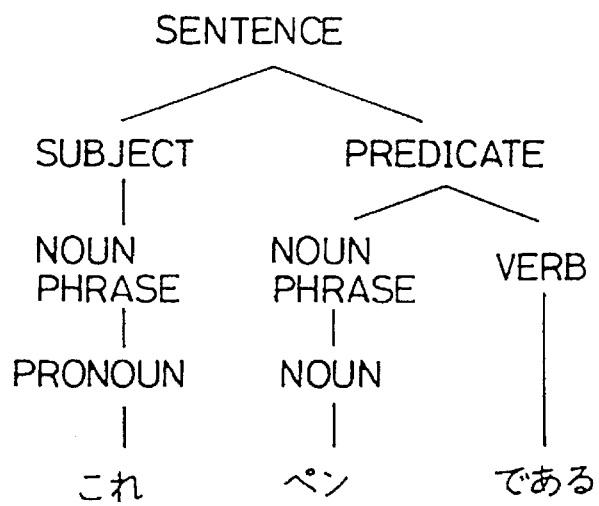

In the translation program, in a processing corresponding to the transformation unit 13, the structure of the parsing tree (see FIG. 7) of an input English language text is transformed into the structure of a parsing tree corresponding to a Japanese language text illustrated in FIG. 8. In this transformation, as in the case of the above-described syntactic analyzing unit 12, the tree structure transformation rules stored in memory 6 are used. This transformation corresponds to shifting from level L3 to the level L9 of FIG. 1. The result is stored in buffer D. The example text used in the description "This is a pen" will be transformed into a Japanese character string "これ ペン である" by this transformation.

Figure 9:
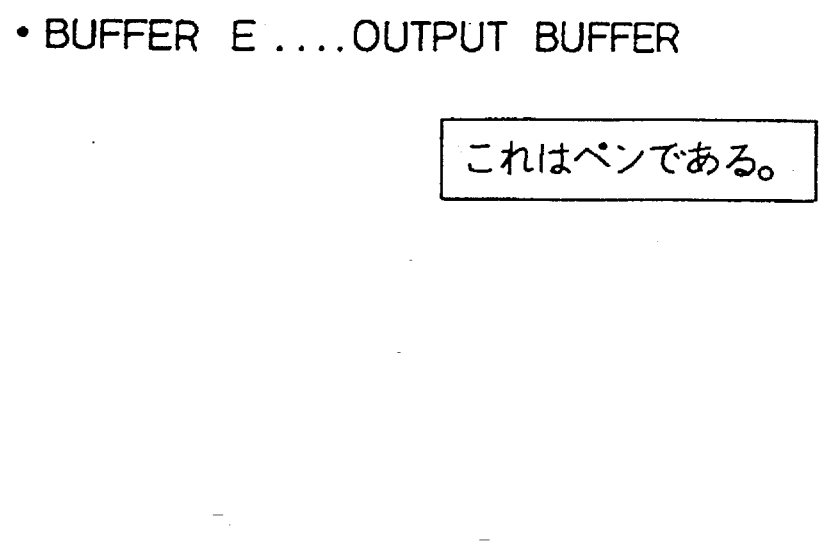

In the translation program, the translated sentence producing unit 14 (in FIG. 2) adds an appropriate particle "は" or an auxiliary verb to the resultant Japanese character string "これ ペン である" to form a grammatically correct Japanese text as shown in FIG. 9 and the same is stored in buffer E. This processing corresponds to a conversion from level L9 to level L10. The resultant Japanese text "これは ペン である" is output from translation module 5, stored in main memory 2 and displayed in display unit 3.

Now, referring to FIGS. 10–18, the process for translating an original source language text including tag signs to a target language including tag signs will be described in detail. This processing removes the tag signs included in the original text before translation. The original text without the tag signs is input to the translation module. The removed tag signs are stored and associated with the particular word of the original text to which the tag sign was attached. Subsequently, the tag signs are replaced after the text is translated.

FIG. 11 is an example of tag signs used in an SGML document. Each tag sign is formed of a pair of tags, i.e., a start tag and an end tag, the group of words between the start tag and the end tag are considered to be marked up.

Tag signs <term> <\term> indicate that a group of words between the tag signs is used for a specific purpose, for example, words used as index entries. Tag signs <emph> <\emph> indicate that a group of words between the tag signs is to be emphasized for printing. For example, the group of words between the tag signs may be printed in bold face or the like.

FIG. 12 shows one example of an English language original text to be translated containing tag signs. The original text is first stored in buffer A. In the original text shown in FIG. 12, several words or group of words are between tag signs. The pair of tag signs, <term> <\term> respectively surround the word(s) "Tag" and "table chart". These word(s) can be entries in producing an index for a document including the sentence. The locations of the portions appearing between the tag sign pairs are stored as the appearing page of each word group in the index. The words "produce" and "specifying" between the tag sign pairs <emph> <\emph> are to be printed in a typeface different from the other parts, for example in bold face.

Figure 10:
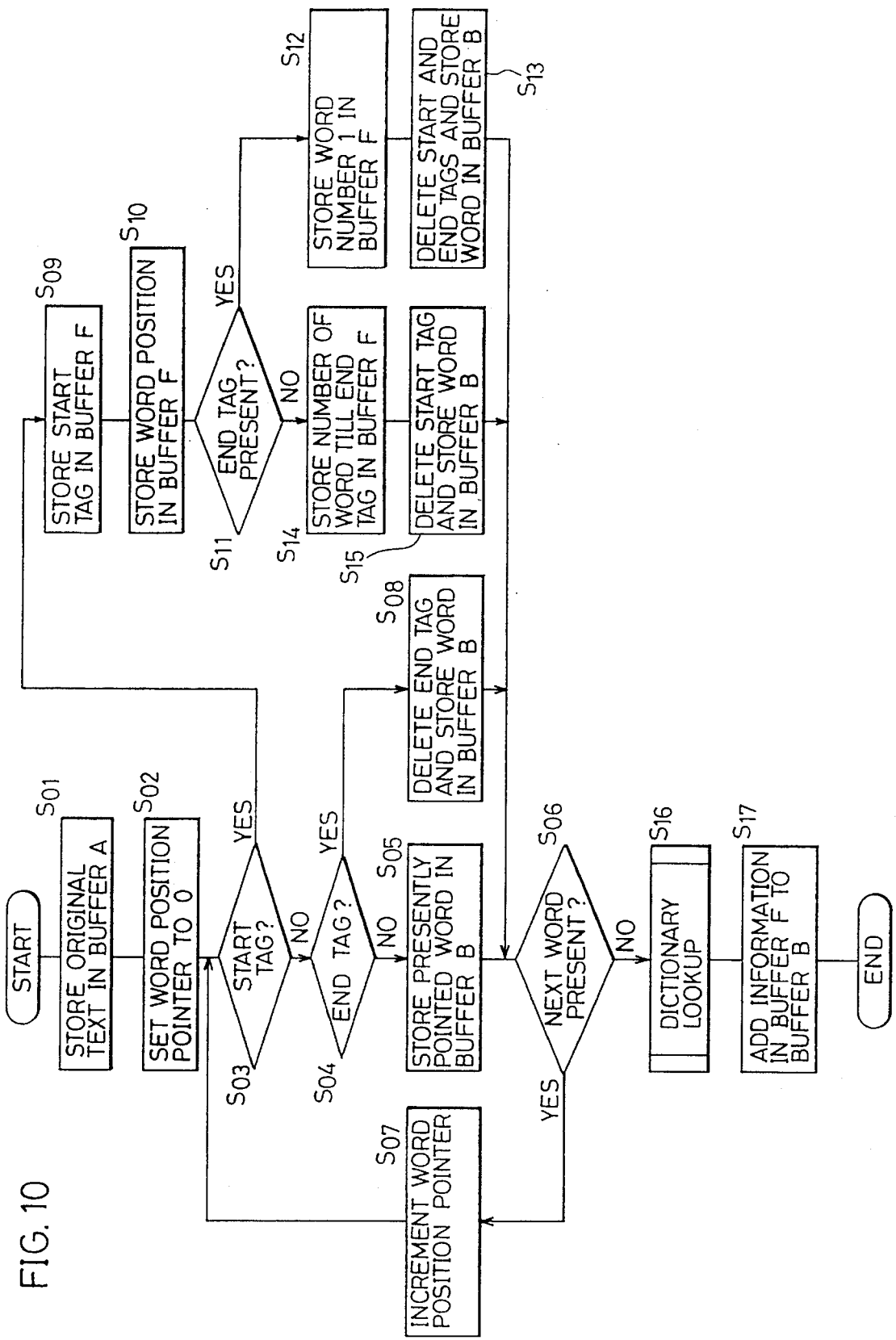
FIG. 10 is a flow chart for use in illustration of tag sign processing.

FIG. 10 is a detailed flow chart for use in illustration of tag sign processing performed by separation unit 10 and dictionary lookup morphological analyzing unit 11 of translation module 5. Referring to FIG. 10, an input text as shown in FIG. 12 is stored in buffer A in step S01.

In step S02, a word position pointer indicating the position of a word to be processed in the original text stored in buffer A is set to 0. In the example, the original word pointed by the word position pointer is "One".

In step S3, a determination is made whether or not the head of the word presently pointed by the word position pointer is a start tag. If it is not determined to be a start tag, the processing proceeds to step S04. If it is determined to be a start tag, the processing proceeds to step S09.

If it is determined that it is not a start tag in step S03, a determination is made whether or not the word pointed by the word position pointer is an end tag in step S04. If it is an end tag, the processing proceeds to step S08, and if it is not an end tag, the processing proceeds to step S05. If the word pointed by the word position pointer is neither a start tag nor an end tag, the word presently pointed by the word position pointer is stored in buffer B (see FIG. 4) in step S05, and processing proceeds to step S06. If it is determined to be an end tag, the end tag is deleted and the word pointed by the word position pointer is stored in buffer B in step S08, and the processing proceeds to step S06.

Meanwhile, if the head of the word pointed by the word position pointer is determined to be a start tag in step S03, the start tag is stored in buffer F in step S09.

In step S10, the word position in the text at which the start tag is detected (in other words the value of the word position pointer) is stored in buffer F in association with the start tag stored in S09.

In step S11, a determination is made of whether or not an end tag is present. If an end tag is present, the processing proceeds to step S12, and otherwise, the processing proceeds to step S14.

In step S12, a word number "1" is stored in buffer F in association with the start tag stored in step S09.

Further in step S13, the start tag and end tag attached to the word in the input original text designated by the word position pointer are deleted and the word is stored in buffer B and the processing proceeds to step S06.

Meanwhile, if the processing proceeds to step S14, a processing for counting the number of words to the end tag is made. The number of words counted is similarly stored in buffer F in association with the start tag stored in buffer F in step S09.

Further in step S15, the start tag attached to the word pointed by the word position pointer is deleted, and then the word is stored in buffer B. The processing then proceeds to step S06.

In step S06, it is determined whether or not the text word is present in buffer A. If the next word is present, the processing proceeds to step S07, and otherwise the processing proceeds to step S16.

In step S07, a processing of incrementing the word position pointer is performed and the processing returns to step S03. Thereafter, the above-described processing will be repeated. When there is no longer a word to be processed in buffer A , the processing proceeds to step S16.

In step S16, dictionary lookup processing is performed for every .entry stored in buffer B. As a result, information on the part of speech and number for every entry is stored in buffer B.

Further in step S17, information on tag signs stored in buffer F is added to the result of the dictionary lookup processing in buffer B. The information representing the tag signs which have been attached to entries with tag signs are added to a corresponding dictionary lookup results.

Now, the process shown in FIG. 10 when performed for the original text shown in FIG. 12 will be described. The word "One" is pointed by the word position pointer by setting the word position pointer to zero. Since the results of the determination in steps S03 and S04 are both "NO", the word "One" is stored in buffer B in step S05. In step S6, the answer becomes YES due to the presence of the next word, "of" and therefore the processing proceeds to step S07. Since the value of the word position pointer is incremented by 1, the next word "of" will be pointed by the word position pointer.

Hereinafter, the same processing as described above is repeated for the words "of" through "this" and these words are sequentially stored in buffer B together with their word positions.

At word position 8, the answer to the determination in step S3 becomes YES and the processing proceeds to SO9. In step SO9, the detected start tag (in this case <term>) is stored in buffer F, and then in step S10, its word position is similarly stored in buffer F. Since the answer to in step S11 is YES, the word number "1" is stored in buffer F in step S12. As a result, tag sign information related to the term "Tag" stored in buffer F takes the form of the first line in FIG. 13. In step S13, the start tag and the end tag are deleted and the word "Tag" is stored in buffer B.

The presence/absence of a start tag and an end tag is determined for each word while incrementing the word position pointer as described above, and each word is stored in buffer B after removing a tag sign. Information as shown in FIG. 14 is provided at buffer B. Information related to tag signs as illustrated in FIG. 13 is obtained at buffer F.

Referring to FIGS. 13 and 14, the word at word position 8, in other words the word "Tag", has a tag sign <term> attached, and as can be seen, the word between the tag sign is only this word. Similarly, the word "produce" at word position 14 has a tag sign <emph> attached. The group of words "table chart" is between the tag sign pair <term> and <\term>. The word "specifying" at word position 25 is between the tag sign pair <emph> and \<emph>.

The stored contents of buffer B becomes as illustrated in FIG. 15 after dictionary lookup processing performed in step S16. More specifically, each entry is supplemented with information related to its part of speech and number produced by the dictionary lookup processing. It is noted that in FIG. 15 specific contents of parts of speech and numbers attached to respective entries are omitted for the sake of simplification of the figure.

In step S17, the contents of buffer F shown in FIG. 13 is added to respective entries in buffer B. This processing is performed by attaching a tag sign stored in buffer F to a word stored in buffer B corresponding to the word position in buffer F in FIG. 13. More specifically, the eighth word "Tag" has a tag sign <Term> attached. Similarly, the word "produce" at word position 14 has a tag sign <emph> attached. The two words "table chart" starting from word position number 15 have each attached with a tag sign <term>. This is because the information of buffer F shown in FIG. 13 indicates that a tag sign <term> will be attached to each of the two words starting at word position 15. The word "specifying" at word position 25 also has a tag sign <emph> attached.

Then, a usual translation processing will be conducted by syntactic analysis unit 12 and transformation unit 13 in FIG. 3 based on the entries stored in buffer B, and their respective part of speech and number, etc. A translated sentence is finally produced by translated sentence producing unit 14.

At that time, if an inputted word to be produced has tag information, translated sentence producing unit 14 produces a start tag and an end tag as indicated by the contents of buffer B shown in FIG. 16 before and after the translation of the word, respectively. If the corresponding word does not have such tag information, only a translated word is produced as usual.

Figure 17:
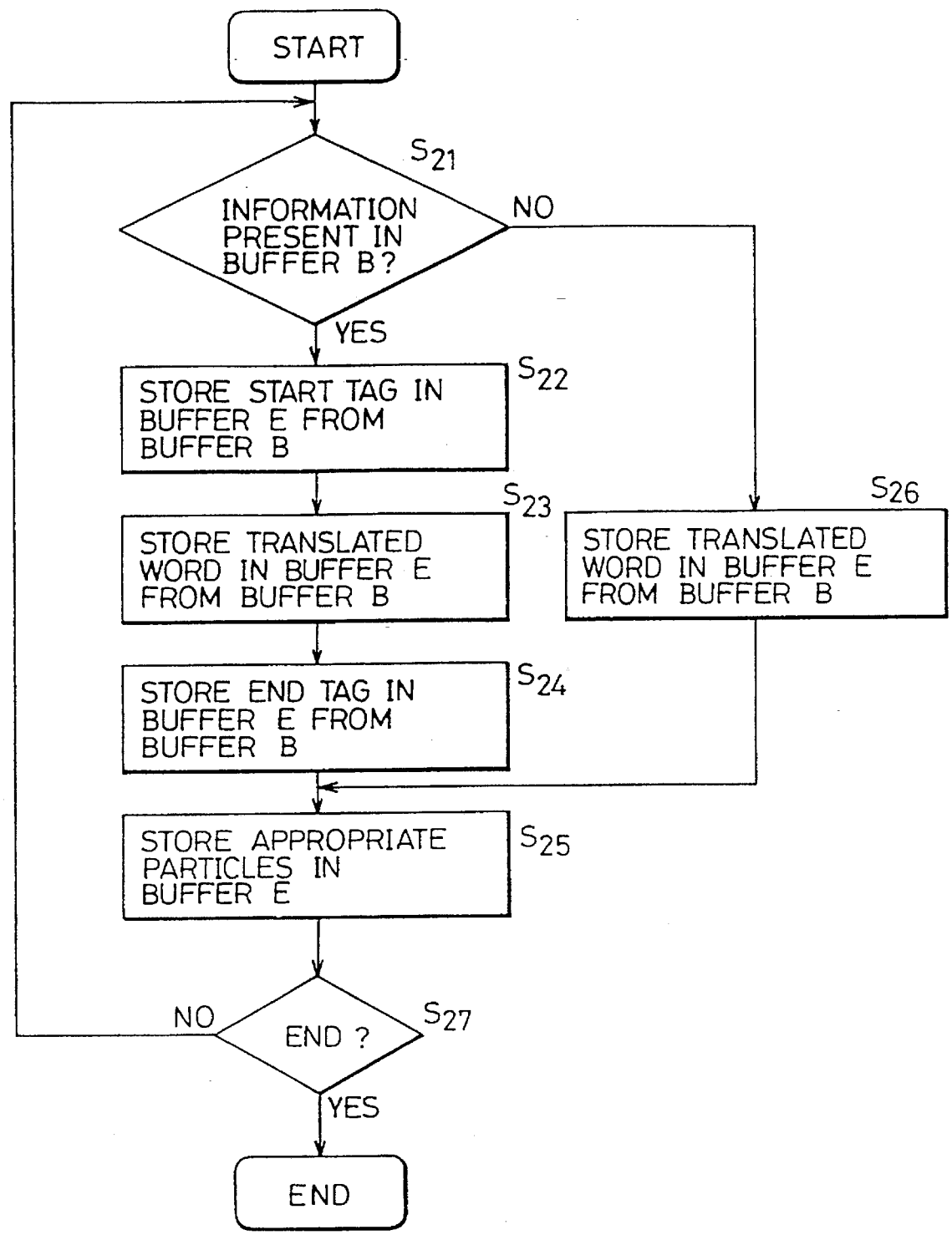
FIG. 17 is a flow chart for use in illustration of a subroutine program in production processing.

This production processing will be described below in conjunction with FIGS. 17 and 18. The processings of steps S21–S27 shown in FIG. 17 are conducted for each word belonging to the "leaf" parts of the parsing tree. First in step S21, for a word, the column labeled "tag" corresponding to the word in buffer B is checked (see FIG. 16), and the presence/absence of tag information is determined. If the information is present, the control proceeds to step S22; otherwise, the control proceeds to step S26.

In step S22, a processing is performed for storing the start tag in buffer E which has been stored in buffer B.

Subsequently, in step S23, the stored translation corresponding to the word undergoing processing is stored in buffer E from buffer B.

Then in step S24, a processing of storing an end tag in buffer E from buffer B is performed.

In step S25 following step S24, an appropriate particle to be attached to the translation is selected, and stored in buffer E. After step S25, the control proceeds to step S27.

Meanwhile, if it is determined that no tag information is present in buffer B at step S21, the control proceeds to step S26. In step S26, a processing concerning tag information is not performed. Thus a processing similar to steps S22 and S24 is not performed, and the translation is simply stored in buffer E from buffer B. After step S26, the control proceeds to step S25.

In step S27, a determination is made as to whether or not the current word is the last word of the parsing tree to be processed. If it is not the last word, the control returns to step S21, and steps S21–S27 are repeated. If it is reached, the production processing is completed.

The final contents of buffer E is illustrated in FIG. 18. The translated sentence shown in FIG. 18 corresponds in the Japanese language to the original English language text shown in FIG. 12. If the same tag information is attached to a plurality of successive words, a start tag is put before a translation corresponding to the head word, and an end tag is attached after the last word. FIG. 18 is obtained in such a manner.

According to the invention, an original text including markup signs such as tag signs can automatically be translated by first removing the tag signs. Furthermore, as in the described embodiment, equivalent tag signs can be produced with the translation from an original source language text with tag signs inserted therein. As a result, it is no longer necessary to manually remove the tag signs before translation, and therefore translation can be more efficiently performed.

As described above, in the translating machine according to the invention, a text body is automatically separated from markup signs, and a parsing tree in the first language is produced based on the separated text body in the same manner as in a conventional apparatus. The parsing tree in the first language is transformed into a parsing tree in a second language in the same manner as the conventional apparatus. Meanwhile, each markup sign is stored in association with a word to which the sign is attached. When a text in the second language is produced from the parsing tree in the second language, a translation corresponding to a word attached with a markup sign in the original text is attached with a markup sign equivalent to the markup sign attached to the original word. Therefore, the markup sign can be ultimately attached to the translation at an appropriate position. It is not necessary to manually delete the markup signs from the original text, or to manually insert the markup signs to the text obtained as a result of translation. As a result, a translating machine capable of translating an original text including markup signs as efficiently as usual original text is provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A translating machine for translating an original text in a first language including one or a plurality of predetermined markup signs into a translated text in a second language, comprising:

means for associating each of said one or a plurality of predetermined markup signs with words within the original text;

separation means for separating the original text into markup signs and a text body exclusive of the markup signs;

storage means for storing each markup sign with each word to which each said markup sign is associated;

means for producing a parsing tree in the second language from said text body; and means for producing, in communication with said means for producing a parsing tree and said storage means, the translated text from said parsing tree and attaching a markup sign to each word within the translated text equivalent to each of said one or a plurality of markup signs associated with each word within the original text.

2. A translating machine as recited in claim 1, wherein said storage means includes, a plurality of word storage means for storing the original text by individually and sequentially storing each word included in said original text in a corresponding one of said plurality of word storage means; and a plurality of markup sign storage means, at least one of which is being provided for each of said plurality of word storage means, for individually storing each of said one or a plurality of predetermined markup signs associated with each word in the original text and stored in a corresponding one of said plurality of word storage means.

3. A translating machine as recited in claim 2, wherein said separation means includes, means for initially storing said original text, means for separating a character string included in said original text by recognizing a prescribed code in separating the character string from the remainder of said original text;

means for determining whether or not said separated character string is associated with one or a plurality of said predetermined markup signs;

means for storing one or a plurality of the predetermined markup signs with each word in the separated character string associated with a predetermined markup sign; and means for storing the non-markup sign character string in one of said plurality of word storage means in a predetermined order in response to said association determining means.

4. A translating machine as recited in claim 3, wherein each of said predetermined markup signs includes a pair of a markup signs with a markup start sign and a markup end sign, and said determining means further comprises, means for determining whether or not said character string begins with a said markup start sign, and means for determining whether or not said character string ends with a said markup end sign.

5. A translating machine as recited in detecting claim 4, wherein said determining means further comprising, first means for detecting a said first markup start sign;

second means for detecting a said first markup end sign to be paired with said first markup start sign; and means, responsive to said first and second detecting means, for associating said first markup start and end signs to said character string.

6. A translating machine as recited in claim 1, wherein said first language is English.

7. A translating machine as recited in claim 6, wherein said second language is Japanese.

8. A translating machine as recited in claim 1, wherein said means for producing the parsing tree in said second language includes, means for producing a parsing tree in said first language corresponding to said original text by performing a prescribed grammatical processing on said text body separated from the markup signs by said separation means, and means for transforming the parsing tree in said first language into a parsing tree in said second language utilizing predetermined transformation rules.

9. A translating machine as recited in claim 1, wherein said means for producing text in said second language includes, means for rearranging words in said first language stored in said word storage means in the order specified by the parsing tree in said second language;

means for allocating a corresponding translation in said second language of each said rearranged words in said first language;

means for attaching a markup sign to each translated word in said second language produced by said allocating means, based on said markup signs stored in said markup sign storage means corresponding to said word storage means; and means for producing a translated sentence in said second language based on the translated words rearranged in the order according to the parsing tree in said second language and attached with said necessary markup signs.

10. A translating machine as recited in claim 9, wherein said predetermined markup signs include a plurality of markup sign pairs each including a markup start sign and a markup end sign, and said attachment means includes, means for determining whether or not to attach a markup start sign to a translated word within the translated sentence corresponding to a markup start sign stored in said storage means, and means for determining whether or not to attach a markup end sign to a translated word within the translated sentence corresponding to a markup start sign stored in said storage means.

* * * * *